(12) United States Patent
Romano

(10) Patent No.: US 10,172,497 B1
(45) Date of Patent: Jan. 8, 2019

(54) BREAD STORAGE DISPENSER DEVICE

(71) Applicant: John J. Romano, Conshohocken, PA (US)

(72) Inventor: John J. Romano, Conshohocken, PA (US)

( * ) Notice: Subject to any disclaimer, the term of this patent is extended or adjusted under 35 U.S.C. 154(b) by 0 days.

(21) Appl. No.: 15/732,430

(22) Filed: Nov. 9, 2017

(51) Int. Cl.
*A47J 47/00* (2006.01)
*A47J 47/12* (2006.01)
*A47G 19/00* (2006.01)
*A47G 19/32* (2006.01)

(52) U.S. Cl.
CPC ............ *A47J 47/12* (2013.01); *A47G 19/32* (2013.01)

(58) Field of Classification Search
CPC ......... A47G 19/32; A47G 19/30; A47J 47/12; A47J 47/02; B65D 81/22; B65D 81/262; B65D 83/005
See application file for complete search history.

(56) References Cited

U.S. PATENT DOCUMENTS

| | | | | |
|---|---|---|---|---|
| 1,917,480 A | * | 7/1933 | Widing | A47G 19/32 312/71 |
| 2,468,497 A | * | 4/1949 | Johnson | A47F 1/065 221/44 |
| 2,915,353 A | * | 12/1959 | Michaelsen | A47J 47/01 211/49.1 |
| 3,275,133 A | * | 9/1966 | Wood | A47K 10/22 206/394 |
| 4,179,040 A | * | 12/1979 | Bateman | A47G 19/30 220/796 |
| 4,266,668 A | * | 5/1981 | Paek | A47J 47/12 206/557 |
| 4,320,932 A | * | 3/1982 | Giffin | A47G 19/32 211/49.1 |
| 4,905,869 A | * | 3/1990 | Grigsby | A47G 19/32 221/124 |

(Continued)

*Primary Examiner* — Kimberley S Wright
(74) *Attorney, Agent, or Firm* — Armand M. Vozzo, Jr.

(57) ABSTRACT

A bread storage dispenser device comprising a housing container made to stand upright having a closed bottom surface and open top end with the housing container further formed having a substantially rectangular chamber extending longitudinally through perimeter walls thereof. A serving drawer assembly is integrally constructed and formed to engage the chamber of the housing container and slide longitudinally therein guided by a pair of side rails on the perimeter walls on opposite sides of the container to a position substantially proximate to the closed bottom surface thereof. The serving drawer assembly includes a top lid member sized to cover and close the open top end of the housing container with a perimeter sealing member secured beneath the lid member, a bottom shelf member having a cross section conforming with the chamber of the housing container and further notched on opposite sides to engage the side rails, and a carriage tray member extending between the top lid and the bottom shelf member configured to retain the slices of bread in a stack held upon the bottom shelf. By raising the serving drawer assembly from its seated position, the stack of bread slices stored within the housing container may be lifted therefrom to allow easy removal of bread slices by the user, and the serving drawer may then be released to descend by itself to a reseated position.

13 Claims, 4 Drawing Sheets

(56) References Cited

U.S. PATENT DOCUMENTS

| | | | | | |
|---|---|---|---|---|---|
| 5,082,135 | A | * | 1/1992 | DeCoster | A47G 19/30 206/804 |
| 5,152,590 | A | * | 10/1992 | Dukes | A47F 1/06 312/306 |
| 5,191,996 | A | * | 3/1993 | Jenkins | A47G 19/32 221/197 |
| 5,337,915 | A | * | 8/1994 | Hall, Jr. | B65D 25/16 206/804 |
| 5,634,560 | A | * | 6/1997 | Phillips | A45D 44/02 206/229 |
| 5,634,569 | A | * | 6/1997 | DeCoster | A47G 19/30 206/519 |
| 5,735,433 | A | * | 4/1998 | Power | A47G 19/32 221/226 |
| 5,823,381 | A | * | 10/1998 | Ashley | A47J 47/12 206/817 |
| 6,601,498 | B1 | * | 8/2003 | O'Brion | A47J 47/12 221/197 |
| 7,387,204 | B2 | * | 6/2008 | Lee | A45C 11/008 206/362 |
| 7,544,294 | B2 | * | 6/2009 | Halterman | A47G 19/30 206/804 |
| 8,152,018 | B2 | * | 4/2012 | Smith | B65D 1/46 220/675 |
| 9,585,521 | B2 | * | 3/2017 | Bagley | A47J 47/12 |
| 2016/0220072 | A1 | * | 8/2016 | Bagley | A47J 47/12 |

* cited by examiner

BREAD STORAGE DISPENSER DEVICE

BACKGROUND OF THE INVENTION

The present invention relates to household devices for food storage, and more particularly to an improved bread storage device capable of keeping a loaf of sliced bread in a self-sealing container with an easy to operate serving drawer that can readily avail any part or all of the stored loaf to the user.

In households and commercial establishments that serve dining customers, the storage of food products to preserve their freshness and flavor is of major importance. Outside of the freezer and refrigerator, many food products, particularly bread, have been stored in kitchens at room temperature to preserve their taste and texture and are often stored in closed containers within easy reach of those who prepare and/or consume the food products. Breadboxes, for example, have long been known and used in American kitchens to slow down the process of staling or retro-gradation of fresh bread, a process in which the starch in the bread transposes to a crystalline form in the presence of the water contained in the bread itself. Because this process can actually be accelerated at cooler temperatures of a refrigerator, the breadbox was designed to sit outside the refrigerator to keep their contents at room temperature and prolong edible storage time. By way of further design criteria, closure of the breadbox was generally loose enough to allow some airflow that would reduce condensation and prevent mold formation and tight enough to protect the contents from bugs and other pests. These breadboxes have remained somewhat popular in commercial usage and can be now found in a variety of structural configurations that are made of various materials, including metal, wood, ceramic and even marble. As a kitchen countertop item, the breadbox of today, however, seems to have become more popular more for their appearance and less for their bread storing function because of limitations evident in their capability to conveniently dispense the stored bread, especially the slices of a pre-sliced loaf, for ready consumption or use in making a sandwich or other food preparations.

The prior art evidences various breadbox-type devices that have been devised and developed principally for storing fresh bread but with an added eye toward facilitating the serving of the stored bread in whole or in part or dispensing the stored bread in one or more individual slices at the selection of the user. A few examples of these prior art breadbox-type devices are found in U.S. Pat. No. 2,915,353 to Michaelsen; U.S. Pat. No. 4,320,932 to Giffin; U.S. Pat. No. 4,500,145 to Fassauer; and U.S. Pat. No. 6,601,498 to O'Brion. While these and other prior art bread storage devices have been generally satisfactory in their functional use, they have had limitations in their ability to draw or remove air from the bread storage container of their articulated structure while effecting closure which can effectively increase the amount of time bread can be stored without going stale, and further have included structural components and mechanisms for serving and/or dispensing the stored bread that have been somewhat complicated and difficult to maintain in a working assembly. There is a need, therefore, for an improved bread storage device capable of keeping a loaf of sliced bread fresher for a longer period of time and when needed, readily able to dispense to the user one or more selected bread slices from the stored loaf for use or consumption.

SUMMARY OF THE INVENTION

Accordingly, it is a general purpose and object of the present invention to provide an improved device for storing fresh bread with integrated dispensing capabilities that operate in a more effective and convenient manner than prior art bread storage devices that have heretofore been designed and developed.

A more particular object of the present invention is to provide an improved bread storage dispenser device capable of keeping a loaf of fresh bread at room temperature for an extended period of time without staling with easy access to the stored bread and the further capability of readily dispensing a desired portion of the loaf to the user whenever needed.

Another object of the present invention is to provide an improved bread storage dispenser device that will hold a pre-sliced loaf of bread in a compact, self-sealing container within a reduced volume of air effected during the closure of the container.

Still another object of the present invention is to provide an improved bread storage dispenser device for household or commercial use that is attractive in appearance and easy to clean and maintain.

A still further object of the present invention is to provide an improved bread storage dispenser device that is simple in its construction and assembly, and foolproof and durable in operation.

Briefly, these and other objects of the present invention are accomplished by a bread storage dispenser device comprising a housing container made to stand upright having a closed bottom surface and open top end with the housing container further formed having a substantially rectangular chamber extending longitudinally through perimeter walls thereof. A serving drawer assembly is integrally constructed and formed to engage the chamber of the housing container and slide longitudinally therein guided by a pair of side rails on the perimeter walls on opposite sides of the container to a position substantially proximate to the closed bottom surface thereof. The serving drawer assembly includes a top lid member sized to cover and close the open top end of the housing container with a perimeter sealing member secured beneath the lid member, a bottom shelf member having a cross section conforming with the chamber of the housing container and further notched on opposite sides to engage the side rails, and a carriage tray member extending between the top lid and the bottom shelf member configured to retain the slices of bread in a stack held upon the bottom shelf.

By raising the serving drawer assembly from its seated position, the stack of bread slices stored within the housing member may be lifted therefrom to allow easy removal of bread slices by the user, and the serving drawer assembly may then be released to descend by itself to a reseated position. In its guided descent, the serving drawer assembly with its downwardly leading bottom shelf acts to move air from the chamber of the housing container until the top lid is reseated and serves to create a compression seal between the top lid with its sealing strip and the open top of the housing for increased freshness protection of the stored bread.

For a better understanding of these and other aspects of the present invention, reference should be made to the following detailed description taken in conjunction with the accompanying drawings in which like reference numerals and character designate like parts throughout the figures thereof.

BRIEF DESCRIPTION OF THE DRAWINGS

For a fuller understanding of the nature and objects of the present invention, references in the detailed description set forth below shall be made to the accompanying drawings in which.

DESCRIPTION OF THE INVENTION

Figure 1:
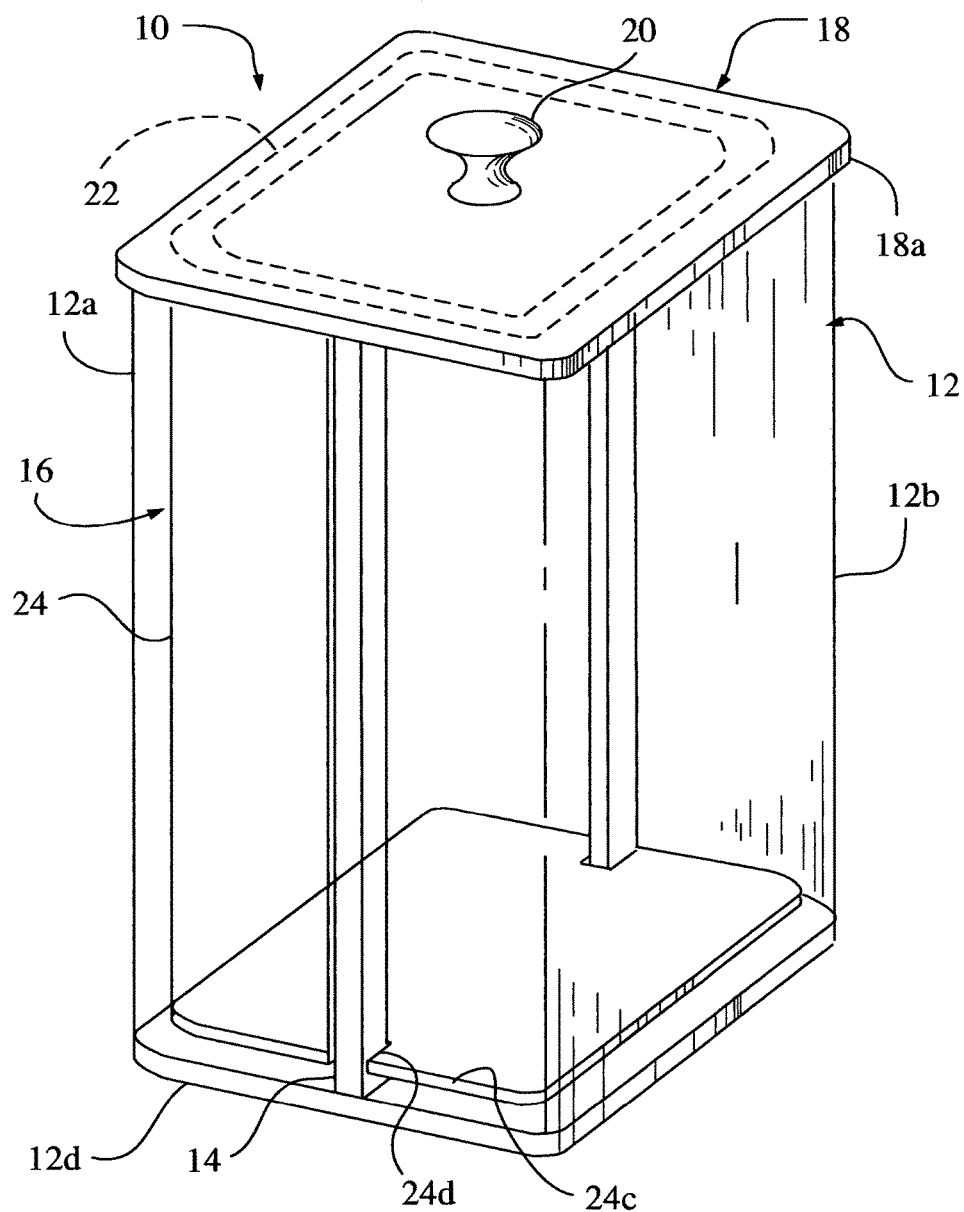
FIG. 1 is a perspective view from above of the bread storage dispenser device of the present invention shown in its normal upstanding state.

The following serves to describe a preferred embodiment of the present invention and the best presently contemplated mode of its production and practice. This description is further made for the purpose of illustrating the general principles of the invention but should not be taken in a limiting sense, the scope of the invention being best determined by reference to any associated claims.

Referring to the drawings, the following is a list of structural components of the present bread storage dispenser device, generally designated 10, and those associated structural elements shown employed in connection with the present invention:

10 bread storage dispenser device;
12 housing container;
12a set of opposite side walls of container;
12b front and back walls of container;
12c chamber of container;
12d base panel of container;
12e open top of container;
14 internal side rails;
16 serving drawer assembly;
18 top lid;
18a lid panel;
20 knob handle;
21 screw attachment
22 sealing member;
24 carriage tray;
24a back panel;
24b side walls;
24c bottom shelf;
24d notched sections; and
B sliced bread loaf.

Referring initially to FIG. 1, the present bread storage dispenser device 10 is shown fully assembled and standing in its normally upright position suitable for contemplated location upon a kitchen countertop or dining table. In accordance with the present invention, the bread storage dispenser device 10 includes two major assemblies, an open-ended housing container 12 and a serving drawer assembly 16 formed for fitted engagement therewith.

Figure 2:
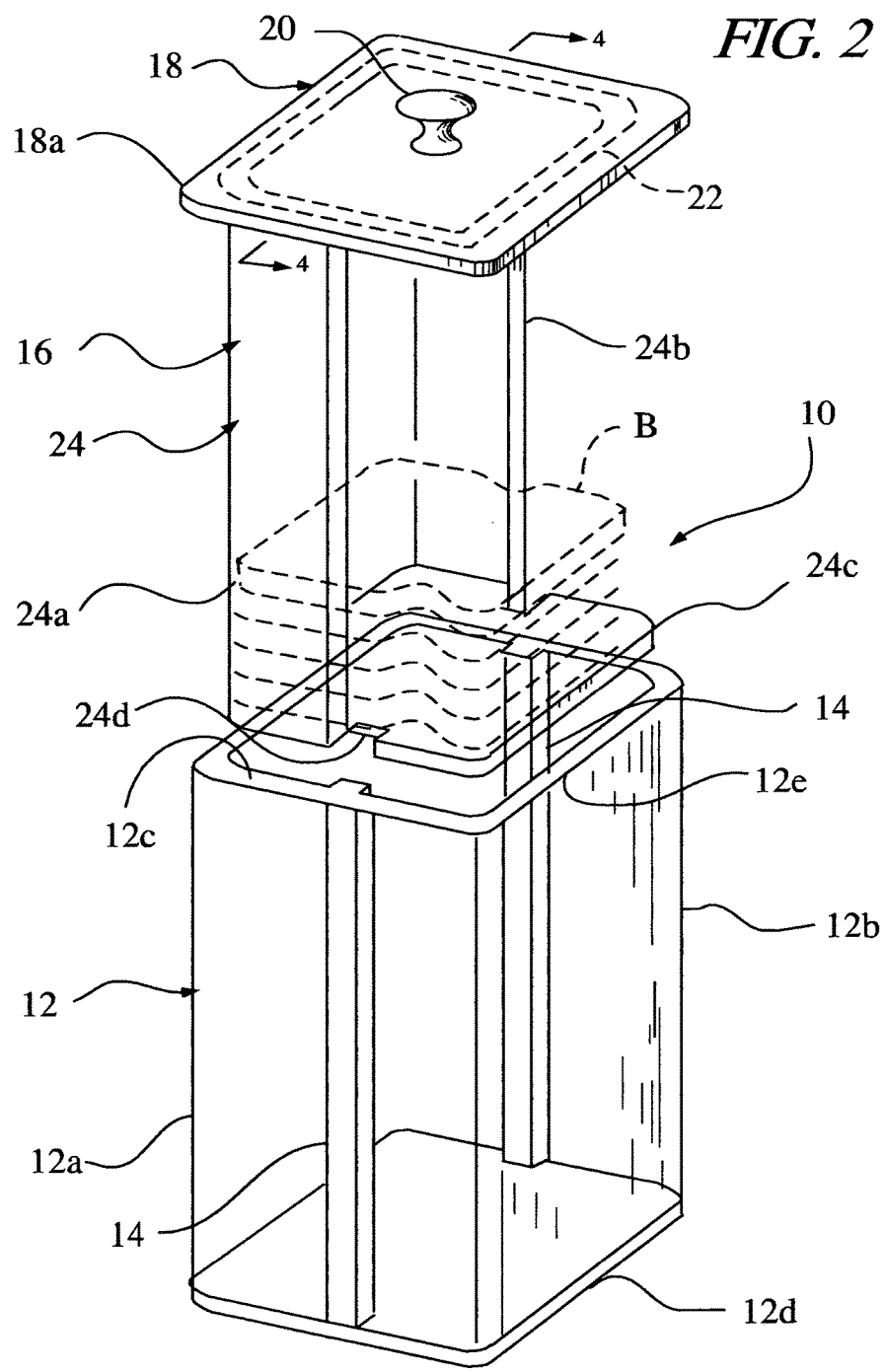
FIG. 2 is an exploded view in perspective of the bread storage dispenser device of FIG. 1 shown with its component assemblies separated and in a position to dispense slices from of loaf of bread (in phantom outline) in accordance with the present invention.

The housing container 12 is integrally constructed having a substantially rectangular configuration defined by a set of perimeter walls 12a on opposite lateral sides and an adjoining set of front and back walls 12b that extend equidistantly in elevational length supported upon a base panel 12d to provide the housing container with an open top end 12e and chamber 12c, both having a rectangular cross-section that is better seen in FIG. 2. In its rectangular configuration, the housing container 12 is generally made to be wider laterally side-to-side than front-to-back with its front and back perimeter walls 12b being relatively wider in their lateral dimension than that of the opposed set of side walls 12a so that the cross-sectional configuration of the chamber 12c may conform more closely with the cross-sectional shape of a standard loaf of sliced bread B as depicted in FIG. 2. Within the chamber 12c of the housing container 12, a pair of elongated rail members 14 each having a relatively square cross-section through their respective lengths are longitudinally disposed and positioned in parallel alignment with each other on the inside of the opposed set of side walls 12a. The rail members 14 serve as guidance registration for the movement of the serving drawer assembly 16 through the housing container 12, described in greater detail below, and are preferably located midway along the lateral dimension of the opposed set of side walls 12a and are affixed thereto, preferably as an integral part of the construction of the housing container. The housing container 12 is made of a rigid and durable lightweight material, such as plastic, and preferably constructed in an integral form using conventional methods of manufacture, such as state of the art molding processes. The housing container 12 may be made to be clear and substantially transparent for consumer visibility, as is shown, or may be made to incorporate colors in some part or all of its completed form.

Referring now to FIG. 2 in conjunction with FIG. 1, the serving drawer assembly 16 of the present bread storage dispenser device 10 is an integral unit in its construction Inserted at its lower end, the serving drawer assembly 16 is made to engage the open top end 12e of the housing container 12 and slide longitudinally within the chamber 12c guided along the pair of side rail members 14 to a fully inserted position just above but substantially proximate to the base panel 12d of the housing container. The serving drawer assembly 16 comprises a top lid 18 having a lid panel 18a sized and shaped to cover and close the open top end 12e of the housing container 12 with a knob handle 20 being secured to the top of the lid panel by conventional screw attachment 21 and a perimeter sealing member 22 being further secured and affixed beneath the lid panel.

Figure 3:
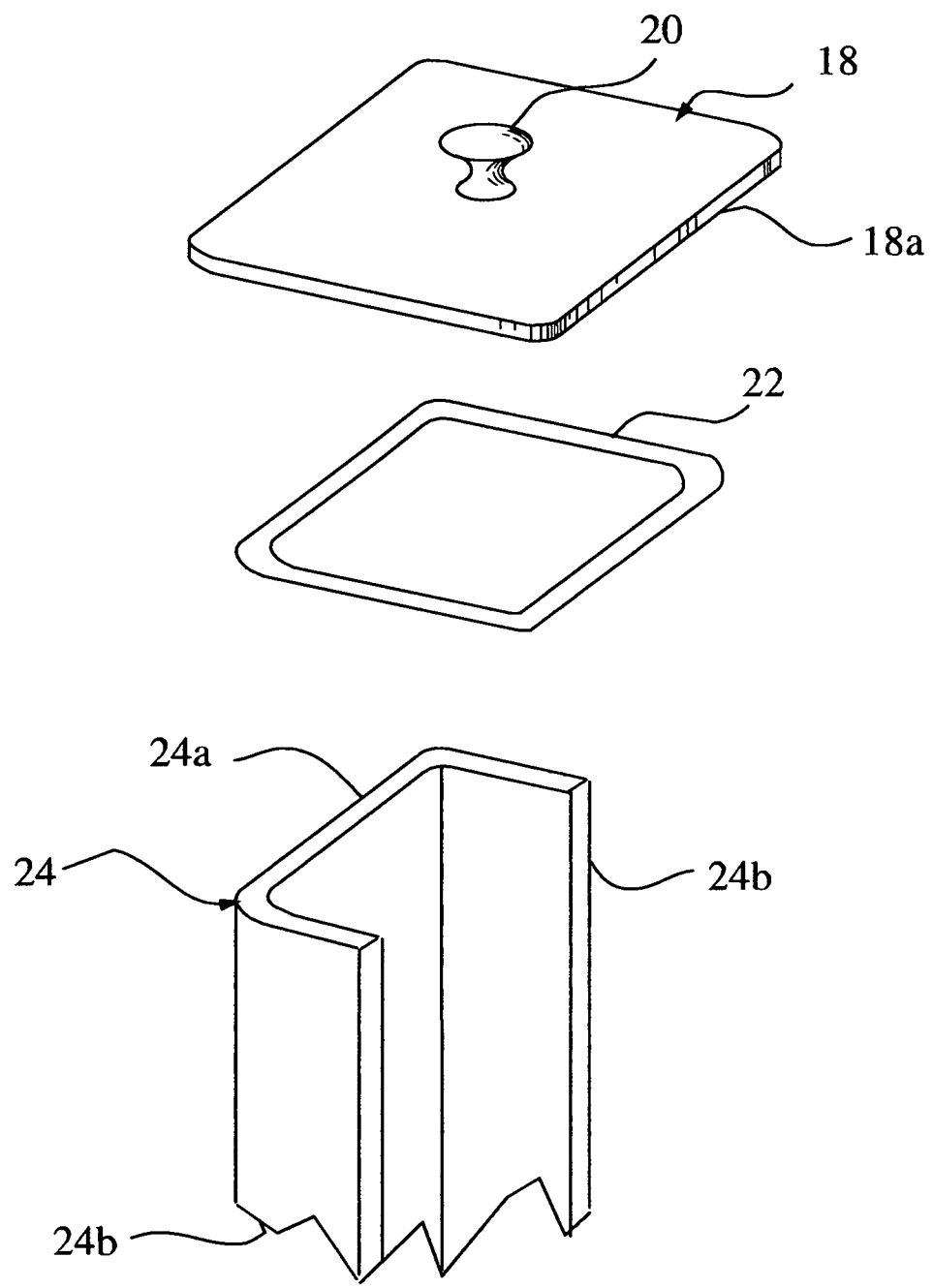
FIG. 3 is a further exploded view in perspective of separate components atop the serving drawer assembly of the present invention shown in FIG. 2.

The perimeter sealing member 22, seen through the top lid panel 18 in FIGS. 1 and 2 and shown separately in FIG. 3, is made from a conventional sealing material, such as a silicone elastomer, and is sized and shaped in its rectangular configuration to replicate and conform with the size and shape of the open top end 12e of the housing container 12 so that it may sit immediately upon and seal the chamber 12c of the housing container in its affixed position beneath lid panel 18 when the top lid 18 of the serving drawer assembly 16 is seated upon the housing container.

The serving drawer assembly 12 further comprises an elongated carriage tray member 24 affixed at one end thereof to the bottom of the lid panel 18a and made to extend therefrom in length sufficient for full insertion to the proximate bottom of the chamber 12c of housing container 12 just above the base panel 12d, as described above, when the top lid 18 with its lid panel and sealing member 22 are properly seated upon the open top end 12e of the housing container. The carriage tray member 24 is constructed comprising a integral three-sided tray section that extends the length of the carriage tray member having a U-shaped cross-section made up of a back panel 24a and a pair of side walls 24b orthogonally projecting on opposite sides and along the length of the back panel. The projected length of the side walls 24b are reduced in their dimension, each extending about one-half the width of the back panel 24a to establish a shallow U-shaped cross-section through the overall length of the carriage tray member. This shallow U-shaped cross-section of the carriage tray member 24 is sized to hold the slices of bread loaf B in close lateral containment without bending or distorting the slices and the reduced height of the side walls 24b eases access and selection of the bread slices from the open end of the U-shaped tray section. Further comprising the carriage tray member 24, a bottom shelf 24c is orthogonally disposed and affixed to the lower end of the U-shaped tray section that is opposite from the top portion of the carriage tray member where the upper end of the tray section is affixed to the top lid 18 and lid panel 18a. The bottom shelf 24c is formed and fabricated having a cross section that closely conforms with that of the chamber 12c of housing container 12 but provides perimeter spacing therebetween, with the bottom shelf further including a notch section 24d that is located on opposite side edges of the bottom shelf and formed in shape and position to engage the rail members 14 on opposite sides of the chamber. With the bottom shelf 24c combined and affixed in place at the base of the U-shaped tray section, the carriage tray member 24 of the serving drawer assembly 16 effectively holds and retains the slices of bread B in a stack within the tray section and supported upon the bottom shelf, as depicted in FIG. 2, despite the intended movement of the serving drawer assembly 16 into and out of the housing container 12.

The serving drawer assembly 16 and its component elements, with exception of the perimeter sealing member 22, as described above, is made of a rigid and durable lightweight material, such as plastic, with its component elements, particularly the carriage tray member 24 being preferably constructed in an integral form using conventional methods of manufacture, such as state of the art molding processes. All component elements of the serving drawer assembly 16, like that of the housing container 12, may be made to be clear and substantially transparent, for consumer visibility, as is shown, or may be made to incorporate colors in some part or all of its completed form.

Figure 4:
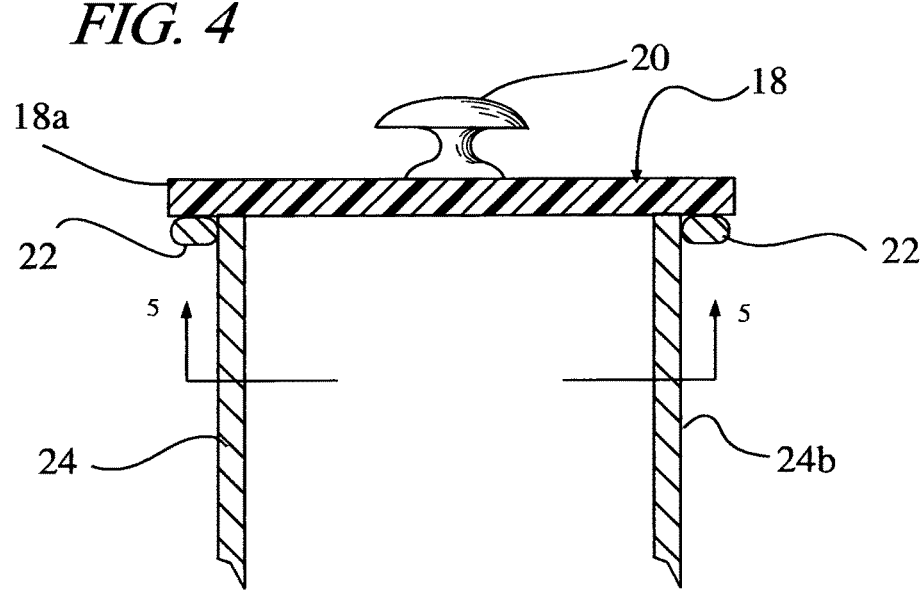
FIG. 4 is a cross-sectional view of the upper portion of the serving drawer assembly taken along the line 4-4 in FIG. 3.
Figure 5:
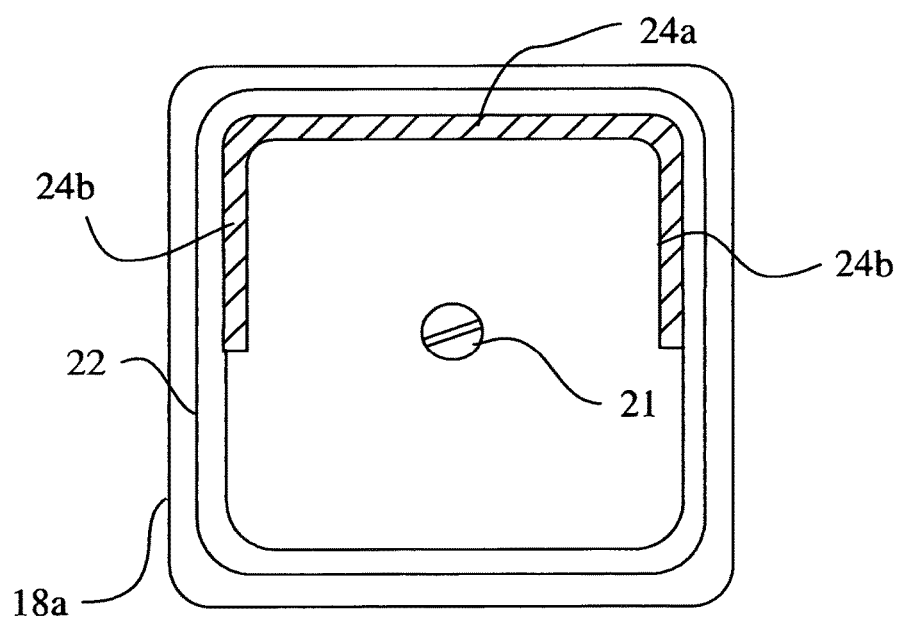
FIG. 5 is a cross-sectional plan view of the upper portion of the serving drawer assembly taken along the line 5-5 in FIG. 4.

Referring now to FIGS. 3, 4 and 5 in conjunction with FIG. 2, the separate component elements of the serving drawer assembly 16 that are secured together at the top of the assembly are shown. As seen in the exploded view of FIG. 3, the perimeter sealing member 22 is positioned immediately beneath the top lid 18 for its attachment to bottom of the lid panel 18a, with the relatively smaller rectangular form of the sealing member being secured upon the lid panel and its larger rectangular surface in such a position that the side edges of the sealing member are equidistantly spaced apart from the outer edges of the lid panel. The uppermost portion of the carriage tray member 24 with its shallow U-shaped form established by back panel 24a and side walls 24b is positioned to fit immediately inside of the rectangular form of the sealing member 22 and be attached directly to the bottom of the lid panel 18a. This relative disposition of the perimeter sealing member 22 immediately surrounding the uppermost portion of the carriage tray member 24 and their joint attachment to the lid panel 18a, as seen in FIGS. 4 and 5, ensures the proper aligned position of the perimeter sealing member atop the open top end 12e of the housing container 12 upon the full insertion of the serving drawer assembly 16 within the container and the seating of the top lid 18 thereon.

For operational use of the present invention, a part or a whole loaf of bread B freshly baked and sliced or taken directly from a standard wrapping can be easily inserted into the present bread storage dispenser device 10 by removing the serving drawer assembly 16 from the housing container 12 and, with the serving drawer assembly 16 held either in a vertical or horizontal attitude, placing the bread loaf with its bottom side down into the carriage tray member 24 with one side of the loaf against the bottom shelf 24c so that the slices of bread are stacked with their top sides projecting from the tray section for inserted storage within the housing container 12.

With the stack of bread slices loaded upon the carriage tray member 24 and stored in the housing container 12, the user can raise the serving drawer assembly 16 from its seated position guided by the rail members 14, and lifting the carriage tray member sufficiently in elevation from the chamber 12c, allow access to the stack and easy removal of the bread slices needed by the user, with the shallow side walls 24b of the tray section providing unencumbered access to the slices from the sides as well as the front of the tray section.

After removing the needed bread slices, the serving drawer assembly 24 may then be released to descend by itself guided in return by the rail members 14 to a reseated position upon the housing container 12. In its guided descent, the serving drawer assembly 24 with its downwardly leading bottom shelf 24c acts to move air from the chamber 12c of the housing container 12 until the top lid is reseated and further serves to create a compression seal between the top lid 18 with its perimeter sealing member 22 positioned in alignment immediately atop the open top end 12e and the housing chamber 12c for increased freshness protection of the stored bread remaining in the device.

It should be particularly noted that an important feature that especially differentiates the present bread storage dispenser device 10 from others heretofore devised and developed is the self-seating serving drawer assembly 16. First, lifting the top lid 18 allows the air to suction into the chamber 12c of the housing container 12 and through a narrow perimeter spacing between the edges of the bottom shelf 24c of the carriage tray member 24 and the interior side walls of the container. This air flow creates a partially trapped air space below the bottom shelf 24c, resulting in a piston effect that will allow the serving drawer assembly 16 along with up to an entire loaf of sliced bread to be let go from any height within the container and descend under control back into the housing container 12. The air retained below the bottom shelf 24c must then by-pass the same perimeter spacing between the shelf and the interior walls of the chamber 12c to exit from beneath the bottom shelf at a rate that allows the serving drawer assembly 16 with its top lid 18 and carriage tray member 24 to descend slowly until the top lid and underside perimeter sealing member meets the open top end 12e of the housing container 12, creating a compression seal for freshness. The downward compression is offered by the weight of the serving drawer assembly 16 along with the bread to apply a degree of seating pressure to ensure a complete seal. The rate of descent of the server drawer assembly 16 can be regulated by lessening or widening the described perimeter spacing between the bottom shelf 24c and the interior of the perimeter walls 12a, 12b of the hosing container 12. Lessening the gap spacing would result in a slower descent of the serving drawer assembly 16 and its carriage tray member 24, while widening the gap spacing would increase the rate of descent.

Therefore, it should be apparent that the above-described invention provide an improved device for storing fresh bread with integrated dispensing capabilities that operate in a more effective and convenient manner than prior art bread storage devices previously designed and developed. More particularly, the disclosed bread storage dispenser device provides the dual capability of keeping a loaf of fresh bread at room temperature for an extended period of time without staling along with an easy access and capability of readily dispensing a desired portion of the loaf to the user whenever needed. The foregoing invention, as described in the structure of its preferred embodiment, can extend the freshness quality of the bread stored therein by keeping the bread in a compact, self-sealing container having with a reduced volume of air being dynamically effected during the reseating and closure of the container. The disclosed bread storage dispenser device is suitable for household or commercial use and is attractive in appearance and easy to clean and maintain. In addition, the present bread storage dispenser device is simple in its construction and assembly, and foolproof and durable in operation.

Obviously, other embodiments and modifications of the present invention will readily come to those of ordinary skill in the art having the benefit of the teachings presented in the foregoing description and drawings. Alternate embodiments of different shapes and sizes, as well as substitution of known materials or those materials which may be developed at a future time to perform the same function as the present described embodiment are therefore considered to be part of the present invention. For example, alterations made in a similar fashion to the cross-sectional configurations of the component parts of the housing container 12 and serving drawer assembly 16 might be effected within the principles of the present invention to accommodate food products other than sliced bread, such as cakes, cookies and other baked products, capable of being stacked in separable portions and thus be deemed within the scope of the present invention. Furthermore, certain modifications to the described embodiment that serve to expand its applications and benefit its usage are within the scope of the present invention. Accordingly, it is understood that this invention is not limited to the particular embodiment described, but rather is intended to cover modifications within the spirit and scope of the present invention as expressed in the appended claims.

What is claimed:

1. A bread storage device for facilitating the manual dispensing of sliced bread stored therein, comprising:
   a housing container formed to stand upright having a closed bottom surface and open top end and a chamber of substantially rectangular cross-section with walls extending longitudinally therethrough;
   a pair of rail members of extended lengths integrally disposed within said housing container on opposite walls of the chamber and extending longitudinally therethrough from the open top end to the closed bottom surface of said container; and
   a serving drawer member assembled and formed to engage the open top end of said housing container and move longitudinally through the chamber along said pair of rail members to a position substantially proximate to the closed bottom surface thereof, said serving drawer member comprising a bottom shelf having a substantially rectangular cross-section conforming with the chamber of said housing container and formed to engage said rail members, a top lid sized and shaped to cover the open top end of said housing container, a perimeter seal secured beneath the top lid to close the top end, and a carriage tray extending between the top lid and the bottom shelf and formed having a three-sided cross-section to hold the sliced bread in a stack supported upon the bottom shelf, whereby the stack of sliced bread stored within the housing container may be lifted therefrom upon the serving drawer member for removal of a desired portion of the stack and then restored by self-guided descent of the serving drawer member along the rail members to a reseated position sealed within the housing container wherein the bottom shelf of said serving drawer member is further provided with a pair of notched areas in the cross-section thereof to engage said rail members and avow passage therethrough;
   wherein the carriage tray of said serving drawer member is integrally formed having a base panel extending the length of the tray member and a pair of side walls each orthogonally disposed and having a reduced height relative to the base panel to provide a shallow U-shaped configuration to the carriage tray for partial lateral containment of the stack of sliced bread supported upon the bottom shelf member.

2. A bread storage device according to claim 1, wherein said pair of rail members each have a relatively square cross-section through their respective lengths and are longitudinally disposed and positioned in parallel alignment with each other on opposite walls of the chamber.

3. A bread storage device according to claim 1, wherein the cross-section of the bottom shelf of said serving drawer member is sized and configured to provide a narrow spacing between the perimeter of the bottom shelf and the walls of the chamber.

4. A bread storage device according to claim 1, wherein the perimeter seal is configured to conform with the open top end of the housing container and secured in position beneath the top lid to align therewith.

5. A bread storage device according to claim 4, wherein the serving drawer member further comprises: a knob handle secured to the top lid member.

6. A bread storage device for facilitating the manual dispensing of sliced bread stored therein, comprising:
   a housing container formed to stand upright having a closed bottom surface and open top end and a chamber of substantially rectangular cross-section with side walls extending longitudinally therethrough;
   a pair of rail members of extended lengths integrally disposed within said housing container on opposite side walls of the chamber, said rail members being longitudinally positioned in parallel alignment with each other and extending from the open top end to the closed bottom surface of said container; and
   a serving drawer assembly integrally formed to engage the open top end of said housing container and move longitudinally through the chamber thereof along said pair of rail members to a position substantially proximate to the closed bottom surface thereof, said serving drawer assembly comprising a bottom shelf formed to engage said rail members and having a substantially rectangular cross-section conforming with the chamber of said housing container with a narrow spacing provided between the perimeter of the bottom shelf and the walls of the chamber, a top lid sized and shaped to cover the open top end of said housing container, a perimeter seal secured beneath the top lid to close the top end, and a carriage tray extending between the top lid and the bottom shelf and formed having a three-sided cross-section to hold the sliced bread in a stack supported upon the bottom shelf, wherein the bottom shelf of said serving drawer assembly is further provided with a pair of notched areas in the cross-section thereof to engage said rail members and allow passage therethrough;

wherein the carriage tray of said serving drawer assembly is integrally formed having a base panel extending the length of the carriage tray member and a pair of side walls each orthogonally disposed and having a shortened height relative to the base panel to provide a shallow U-shaped configuration to the carriage tray for partial lateral containment of the stack of sliced bread supported upon the bottom shelf member.

7. A bread storage device according to claim 6, wherein the perimeter seal is configured to conform with the open top end of the housing container and is secured in position beneath the top lid to align therewith.

8. A bread storage device according to claim 7, wherein the serving drawer assembly further comprises: a knob handle secured to the top lid member.

9. A food storage device for facilitating the manual dispensing of separable portions of a stacked food product stored therein, comprising:
a housing container formed to stand upright having a closed bottom surface and open top end and a chamber extending longitudinally therethrough sized and shaped in cross-section to conform with the cross-section of the food product;
a plurality of rail members of extended lengths integrally disposed within said housing container and extending longitudinally therethrough from the open top end to the closed bottom surface thereof; and
a serving drawer assembly formed to engage the open top end of said housing container and move longitudinally through the chamber along said plurality of rail members to a position substantially proximate to the closed bottom surface thereof, said serving drawer assembly comprising a bottom shelf member having a cross-section conforming with the chamber of said housing container and formed to engage said rail members, a top lid member sized and shaped to cover the open top end of said housing container, a perimeter seal member secured beneath the top lid to close the top end, and a carriage tray member extending between the top lid and the bottom shelf members and formed having a three-sided cross-section to hold the stacked food product supported upon the bottom shelf member,
whereby the stacked food product stored within said housing container may be lifted therefrom upon said serving drawer assembly for removal of a separable amount of the food product and then restored by the descent of said serving drawer assembly along the rail members to a reseated position sealed within said housing container wherein the bottom shelf of said serving drawer assembly is further provided with a pair of notched areas in the cross-section thereof to engage said rail members and allow passage therethrough;
wherein the carriage tray member is integrally formed having a base panel extending the length of the tray member and a pair of side walls each orthogonally disposed and having a reduced height relative to the base panel to provide a shallow U-shaped configuration to the carriage tray member for partial lateral containment of the stacked food product supported upon the bottom shelf member.

10. A food storage device according to claim 9, wherein said pair of rail members each have a relatively square cross-section through their respective lengths and are longitudinally positioned in parallel alignment with each other on opposite walls of the chamber.

11. A food storage device according to claim 9, wherein the cross-section of the bottom shelf of said serving drawer assembly is sized and configured to provide a narrow spacing between the perimeter of the bottom shelf and the walls of the chamber.

12. A food storage device according to claim 9, wherein the perimeter seal is configured to conform with the open top end of the housing container and disposed beneath the top lid to align therewith.

13. A food storage device according to claim 12, wherein the serving drawer assembly further comprises: a knob handle secured to the top lid member.

* * * * *